United States Patent [19]

Wright, Jr.

[11] 3,911,185

[45] Oct. 7, 1975

[54] HIGH RING AND BALL SOFTENING POINT HOT MELT BACKSIZE ADHESIVE COMPOSITION

[75] Inventor: Kenneth Yerxa Wright, Jr., Wilmington, Del.

[73] Assignee: E. I. Du Pont de Nemours and Company, Wilmington, Del.

[22] Filed: Sept. 26, 1974

[21] Appl. No.: 509,563

[52] U.S. Cl............. 428/97; 260/28.5 AV; 260/887
[51] Int. Cl.² .................. D03D 27/00; D04H 11/00
[58] Field of Search ................................ 161/62–67; 117/136, 138.8 A, 143 A, 161 UZ, 161 UD, 161 UH, DIG. 5; 260/28.5 D, 28.5 AV, 887, 897 R, 897 A, 897 B, 901

[56] References Cited

UNITED STATES PATENTS 3,583,936   6/1971   Stahl ........................... 260/28.5 AV

*Primary Examiner*—Marion E. McCamish

[57] ABSTRACT

Backsize compositions, which result in tufted carpets of improved temperature resistance, comprise a blend of an ethylene/vinyl ester copolymer, a low molecular weight high density polyethylene, paraffin wax, antioxidant, filler, a dicyclopentadiene alkylation polymer, and an aliphatic thermoplastic hydrocarbon resin substantially free of polymerized aromatics.

14 Claims, No Drawings

HIGH RING AND BALL SOFTENING POINT HOT MELT BACKSIZE ADHESIVE COMPOSITION

BACKGROUND OF THE INVENTION

1. Field of the Invention

This invention relates to carpet backsizing, and more particularly, it relates to high ring and ball softeniing point hot melt backsize adhesive compositions.

2. Description of the Prior Art

Backsizing of tufted carpets with hot melt backsize adhesives has been known now for some years. U.S. Pat. No. 3,551,231 discloses a process for applying a hot melt backsize adhesive blend of ethylene/vinyl ester copolymer, petroleum wax, and a thermoplastic resin. Satisfactory carpets are made by applying a critical pressure on the tufted structure while it is in contact with the hot melt adhesive applicator roll. The necessity of maintaining such critical pressure during the adhesive application detracts from process flexibility.

U.S. Pat. No. 3,684,600 discloses the application of a low viscosity precoat adhesive to the backside of the tufted structure prior to the application of the hot melt backsize adhesive compositon. By using the precoat adhesive, the necessity of maintaining a critical pressure on the carpet during the hot melt adhesive application can be eliminated. The backsize adhesive composition contains ethylene/vinyl ester copolymer, low molecular weight, low density polyethylene, microcrystalline wax, aliphatic thermoplastic hydrocarbon resin, dicyclopentadiene alkylation polymer, antioxidant and filler.

U.S. Pat. No. 3,583,936 discloses a hot melt backsize adhesive composition comprising an ethylene/vinyl ester or acrylate polymer, a wax of sufficiently high melting point to yield a blend softening point of at least 190°F., a blend of aliphatic thermoplastic hydrocarbon resin and a dicyclopentadiene alkylation polymer, and optionally a filler.

U.S. Pat. No. 3,745,054 relates to high filler content hot melt backsize adhesive compositions comprising ethylene/vinyl ester copolymer, paraffin wax, microcrystalline wax, aliphatic thermoplastic hydrocarbon resin, dicyclopentadiene alkylation polymer, antioxidant and filler.

U.S. Pat. No. 3,723,371 deals with the improvement in the creep property of hot melt adhesive compositions comprising ethylene/vinyl ester copolymer and an aromatic hydrocarbon-aldehyde resin. The improvement is obtained by the inclusion of crystalline wax components melting at 150°F.–225°F.

SUMMARY OF THE INVENTION

According to the present invention there is provided a composition having a ring and ball softening point of at least about 230°F. comprising (A) about 4–25 weight percent ethylene/vinyl ester copolymer having a melt index of about 2 to 150, a copolymerizable ethylene content of about 72 to 82 weight percent, a copolymerizable vinyl ester content of about 18 to 28 weight percent, wherein the acid moiety of said vinyl ester contains 1 to 4 carbon atoms, (B) about 0.7–5 weight percent of an ethylene homopolymer having a molecular weight of about 1,500–3,000, a density of about 0.94–0.97 g./cm.$^3$ and a melting point of about 240°F.–270°F., (C) about 10–15 weight percent of a polymer resin derived from the alkylation of aromatic compounds with dicyclopentadiene and having a softening point of about 40°F.–105°F., (D) about 10–15 weight percent of an aliphatic thermoplastic hydrocarbon resin substantially free of polymerized aromatics prepared from diene and olefin monomers of 5 to 7 carbon atoms, and having a softening point of about 155°F.–240°F.. (E) about 0.5–8 weight percent of a paraffin wax, and (F) about 25–75 weight percent filler.

According to the present invention there are further provided carpets having improved temperature resistance obtained by the use of the above compositions as the backsize adhesive.

DETAILED DESCRIPTION OF THE INVENTION

It has been discovered that high melting point (about 240°F.–270°F.), low molecular weight (about 1,500–3,000), high density (0.94–0.97 g./cm.$^3$) LMW/HD polyethylene results in unexpectedly high ring and ball softening point (at least about 230°F.) hot melt backsize adhesive compositions when combined with ethylene/vinyl ester copolymers, a low molecular weight alkyl aromatic polymer, an antioxidant and filler. The viscosity of suitable homopolymers of ethylene is between about 25 and 5,000 centipoises at 300°F. Other high melting point (240°F.–455°F.) and high density hydrocarbons that are similar in their general nature to polyethylene nevertheless do not result in ring and ball softening points higher than about 210°F. (cf., Table I).

The maximum desirable blend ring and ball softening point is dictated by the application temperature of the hot melt blend during carpet backsizing. Generally steam is used for heating the blend at the coater and the customarily available steam pressure is around 125 lb./in.$^2$ gauge (353°F.). Thus the blend should have the desired operating viscosity at the blend temperature of about 300°–320°F. If the ring and ball softening point of the blend is much above 250°F. the blend viscosity might be too high at the available operating temperatures. Thus a ring and ball softening point of about 230°F.–250°F. affords the best compromise of high temperature resistance of the resulting carpet and desirably low operating viscosity at readily available application temperatures.

As the ethylene homopolymer ingredient it is suitable to employ products that are obtained either by direct polymerization or by thermally cracking high density ethylene polymers.

The low molecular weight-high density polyethylene is present in the composition of the present invention in about 0.7–5 weight percent, preferably about 1.7–3 weight percent. The range of 2.7–2.9 percent is particularly preferred.

Ethylene copolymers most useful in the present invention are copolymers of ethylene with vinyl esters of lower carboxylic acids. Such ethylene/vinyl ester copolymers can be prepared by known techniques, such as illustrated in U.S. Pat. 2,200,429 and U.S. Pat. No. 2,703,794. While an ethylene/vinyl acetate copolymer is preferred, other ethylene copolymers, such as those of vinyl formate, vinyl propionate, and vinyl butyrate, are useful as well. The suitable ethylene copolymers have melt indexes, as measured by ASTM 1238-52T, of about 2–150, preferably about 10–25, with polymerized ethylene content of about 75 weight percent. Correspondingly, the polymerized ester content of useful ethylene copolymers is about 25 weight percent. Additionally, ethylene copolymers containing minor amounts (i.e., up to about 3 weight percent) of polymerizable comonomers, such as acrylic acid, methacrylic acid, itaconic acid, acrylamide, beta dimethylaminoethyl methacrylate, beta hydroxyethyl acrylate, diallyl maleate, diallyl phthalate, diallyl ether, or ethylene glycol dimethacrylate, are useful as well.

The ethylene copolymer should be present in the blend in about 4–25 weight percent, preferably about 8–25 weight percent.

Low molecular weight dicyclopentadiene alkylation polymers suitable for the compositions of the present invention have ring and ball softening points of about 40°F.–105°F. These are described in U.S. Pat. No. 3,023,200 wherein it is stated that the term "alkylation" refers to the formation of a carbon to carbon bond between an aromatic nucleus and a dicyclopentadiene nucleus. Also this patent describes hos dicyclopentadiene alkylation polymers can be prepared with desired softening points and molecular weights. Particularly useful resins have specific gravities of about 0.9–1.1, melt viscosities of about 1 poise over the temperature range of about 175°F.–265°F., and softening points of about 55°F.–90°F. The low molecular weight dicyclopentadiene alkylation polymers are present in about 10–15 weight percent.

As a further ingredient aliphatic thermoplastic petroleum hydrocarbon resins, such as described in Canadian Pat. No. 531,202, are employed. As set forth therein, these resins are prepared from reactive olefins and diene monomers having low carbon atoms content (5–7 carbon atoms), and are substantially free of polymerized aromatics. Of the resins therein described, those having molecular weights of about 800–1,750, iodine numbers of about 40–66, and ring and ball softening points (ASTM D-36-26) of about 155°F.–240°F., and especially above 215°F., are preferred. These resins can be present in an amount of about 10–15 weight percent.

An additional ingredient of suitable backsize adhesive compositions is paraffin wax. Paraffin waxes having a melting point of about 146°F. to 158°F., low needle point penetration (about 6–24 at 77°F.) and low oil content (0.1–0.25 percent) are preferred. Microcrystalline waxes (between about 160°F. and 180°F.) can also be used. Generally, the wax is present in about 0.5–8 weight percent.

The use of an antioxidant, such as butylated hydroxytoluene, in about 0.1–0.3 weight percent is advantageous.

Fillers, such as calcium carbonate, aluminum hydrate, etc., in about 25–75 weight percent, are also incorporated in the compositions of the present invention.

The particular manner in which the ingredients are added to formulate the compositions of the present invention is not critical and can be accomplished by any of the well known techniques.

Carpets having improved temperature resistance result when the blends of the present invention are used as the backsize adhesive composition, either with a secondary backing or alone, such as in a unitary carpet construction. If higher pill anf fuzz resistance is required, a precoat consisting of a low molecular weight, low or high density homopolymer of ethylene, microcrystalline wax, low molecular weight dicyclopentadiene alkylation polymer, aliphatic thermoplastic hydrocarbon resin and an antioxidant, can be applied prior to the application of the main backsize composition described above. The higher ring and ball softening point of the present compositions provides several advantages for the carpets wherein such compositions are used as the backsize adhesive: (a) heat steaming tapes can be applied more quickly and with less risk of edge raveling; (b) softening of melt due to heat such as building heaters, solar heat, or heat-up during transit, will be less prevalent. Placing a lower softening point carpet, even temporarily, over a hot air outlet can cause unintentional softening, adhesive migration an resultant delamination of the carpet; (c) resistance to flammability is customarily tested by first predrying the carpet for 2 hours at 220°F. The lower softening point blend carpets can delaminate under these conditions.

The following examples, wherein all parts and percentages are by weight, except where otherwise specified, further illustrate the advantages of the present invention.

EXAMPLES 1–2

Backsize adhesive blends of U.S. Pat. Nos. 3,551,231 and 3,684,600 have ring and ball softening points of about 210°F. A typical example of such a blend is as follows:

8.1 percent ethylene/vinyl acetate copolymer 0.9 percent paraffin wax, melting point: 149°F., ("Pacemaker" 53, available from Cities Service Oil Company)

1.24 low molecular weight, low density (LMW/LD) polyethylene 5.4 percent microcrystalline wax, melting point 177°F. ("Shellmax" 400, available from Shell Chemical Company)

12.13 percent unsaturated aliphatic thermoplastic, hydrocarbon resin, melting point 212°F., ("Piccopale" 100SF, available from Hercules Inc.

12.13 percent dicyclopentadiene alkylation polymer, melting point 77°F. ("Piccovar" AP 25, available from Hercules Inc.

0.1 percent butylated hydroxytoluene (2,4-Di-Tert-butyl-p-cresol)

60.0 percent carbonate filler.

Replacement of the low molecular weight/low density polyethylene with high melt point hydrocarbon waxes did not increase the ring and ball softening point: however, the use of low molecular weight/high density (LMW/HD) homopolymers of ethylene resulted in a 27°F. to 34°F. increase in the ring and ball softening point as shown in Table I.

TABLE I

EFFECT OF HOMOPOLYMERS AND HYDROCARBONS ON RING AND BALL SOFTENING POINT

| Ingredients | Melt Point °F. | C1 | C2 | C3 | C4 | Examples C5 | C6 | C7 | 1 | 2 |
|---|---|---|---|---|---|---|---|---|---|---|
| "Elvax" 350, Ethylene/Vinyl Acetate Copolymer[1] | — | 8.1 | 8.1 | 8.1 | 8.1 | 8.1 | 8.1 | 8.1 | 8.1 | 8.1 |
| Paraffin wax | 149 | 0.9 | 0.9 | 0.9 | 0.9 | 0.9 | 0.9 | 0.9 | 0.9 | 0.9 |
| "AC" 8 LMW/LD Polyethylene[2] | 240 | 1.3 | | | | | | | | |

TABLE I—Continued

EFFECT OF HOMOPOLYMERS AND HYDROCARBONS ON RING AND BALL SOFTENING POINT

| Ingredients | Melt Point °F. | C1 | C2 | C3 | C4 | Examples C5 | C6 | C7 | 1 | 2 |
|---|---|---|---|---|---|---|---|---|---|---|
| "Epolene" N12 LMW/LD Polyethylene[3] | 230 | | 1.3 | | | | | | | |
| "Witco" W8689 LMW/LD Hydrocarbon[4] | 240 | | | 2.0 | | | | | | |
| "Witco" W8688 LMW/LD Hydrocarbon[5] | 170 | | | | 2.0 | | | | | |
| "Acrawax" CT LMW/LD Hydrocarbon[6] | 284 | | | | | 1.3 | | | | |
| "Acrawax" HMS LMW/LD Hydrocarbon[7] | 455 | | | | | | 1.3 | | | |
| "Polywax" 1000 LMW/HD Polyethylene[8] | 235 | | | | | | | 1.3 | | |
| "Polywax" 2000 LMW/HD Polyethylene[9] | 257 | | | | | | | | 1.3 | |
| X-709 LMW/HD Polyethylene[10] | 264 | | | | | | | | | 1.3 |
| Wax and Resins[11] | — | 29.7 | 29.7 | 31 | 31 | 29.7 | 29.7 | 29.7 | 29.7 | 29.7 |
| Filler[12] | — | 60 | 60 | 58 | 58 | 60 | 60 | 60 | 60 | 60 |
| Ring and Ball Softening Point of Blend, °F. | | 210 | 211 | 164 | 162 | 182 | 175 | 208 | 237 | 244 |

Footnotes to Table I:
[1]24–26% VAc, 17–21 m.i., available from E. I. du Pont de Nemours and Company.
[2]molecular weight: 3500, density: 0.93, available from Allied Chemical Company.
[3]molecular weight: 2300, density: 0.938, available from Eastman Chemical Products.
[4]density: 0.95, available from Witco Chemical Corp.
[5]synthetic soft wax, density: 0.917, available from Witco Chemical Corp.
[6]light tan, hard solid, fatty diamide synthetic wax, density: 0.97, available from Glyco Chemicals, Inc.
[7]tan, coarse powder, fatty diamide synthetic wax, density: approximately 1.0, available from Glyco Chemicals, Inc.
[8]molecular weight: 1000, density: 0.961, available from Petrolite Corp. (Bareco Div.).
[9]molecular weight: 2000, density: 0.96, available from Petrolite Corp. (Bareco Div.).
[10]molecular weight: 3000, density: 0.96, experimental sample obtained from Petrolite Corp. (Bareco Div.).
[11]mixture of 5.4% "Shellmax" 400, 12.13% "Piccopale" 100 SF, 12.13% "Piccovar" AP 25 and 0.3% butylated hydroxytoluene (BHT).
[12]calcium carbonate.

EXAMPLES 3–5

An increase in ring and ball softening point can also be obtained by adding the LMW/HD homopolymer of ethylene to the blend containing the LMW/LD homopolymer. Table II shows how adding a high density homopolymer to a blend such as C1 in Table I effects the ring and ball softening point of the hot melt blend.

TABLE II

| | C8 | Examples 3 | 4 | 5 |
|---|---|---|---|---|
| % Ethylene Copolymer | 8.1 | 8.1 | 8.1 | 8.1 |
| % Paraffin Wax, 149°F. m.p. | 0.9 | 0.9 | 0.9 | 0.9 |
| % Low Density Homopolymer[1] | 1.3 | 1.3 | 1.3 | 1.3 |
| % High Density Homopolymer[2] | 0 | 0.7 | 1.1 | 1.7 |
| % Wax and Resins[3] | 29.7 | 29.0 | 28.6 | 28.0 |
| % Filler | 60 | 60 | 60 | 60 |
| Blend Ring and Ball Softening Point, °F. | 212 | 226 | 234 | 233 |

[1]"AC" 8
[2]"Polywax" 2000, molecular weight: 2000, density: 0.96, available from Petrolite Corp. (Bareco Div.)
[3]As given in Table I.

EXAMPLES 6–7

The use of different resins in the increased ring and ball softening point blends of the present invention are illustrated in these Examples. The composition and properties of the blends are summarized in Table III.

TABLE III

| Ingredients | C9 | Examples 6 | 7 |
|---|---|---|---|
| % Ethylene/Vinyl Acetate Copolymer[1] | 8.1 | 8.1 | 8.1 |
| % Paraffin Wax, 149°F. m.p. | 0.9 | 0.9 | 0.9 |
| % "AC" 8 | 1.3 | — | — |

TABLE III -Continued

| Ingredients | C9 | Examples 6 | 7 |
|---|---|---|---|
| % "Polywax" 2000 | — | 1.3 | 1.3 |
| % "Shellmax" 400 | 5.3 | 5.3 | 5.3 |
| % "Piccopale" 100 SF | 12.1 | 12.1 | — |
| % "Picco" 6140—3[2] | — | — | 12.1 |
| % "Piccovar" AP 25[3] | 12.1 | 12.1 | — |
| % "Piccovar" AP 10[4] | — | — | 12.1 |
| % BHT | 0.2 | 0.2 | 0.2 |
| % No. 9W[5] | 60.0 | 60.0 | 60.0 |
| Viscosity, cps. at 310°F. | 10–11 M | 12 M | 10–11 M |
| Blend ring and ball softening point, °F. | 210 | 230–237 | 234 |

Footnotes to Table III:
[1]24–26% VAc, 17–21 m.i.
[2]low molecular weight hydrocarbon resin, m.p. 284°F., density: 1.06, Color Gardner max. 10, acid no. <1, melt viscosity: 1 poise at 222°C.
[3]dicyclopentadiene alkylation polymer, m.p. 77°F., density: 0.97, melt viscosity: 1 poise at 99°C.
[4]dicyclopentadiene alkylation polymer, m.p. 50°F., density: 0.93, melt viscosity: 1 poise at 85°C.
[5]calcium carbonate filler.

EXAMPLES 8–14

"Alathon" 7050 (density of 0.96 g./cc.; melt index of 17.5 g./10 min.) and "Alathon" 7840 (density 0f 0.96 g./cc.; melt index of 6.0) both high density polyethylenes were thermally cracked for about ½ minute, in the absence of oxygen, at a temperature of 550°C. and 500°C., respectively. "Alathon" 7050 yielded cracked polyethylene A and "Alathon" 7840 yielded cracked polyethylene B.

The cracked polyethylene products were incorporated in blends consisting of 19.8 percent "Elvax" 350, 2.2 percent "Pacemaker" 53 wax, 45.1–48 percent "Piccovar" L60 (dicyclopentadiene alkylation polymer, m.p. 140°F.), and 30 percent calcium carbonate filler, in the amounts indicated in Table IV. Blends containing LMW/HD "Polywax" 2000 or LMW/LD "AC" 8 as the polyethylene ingredient were also prepared for comparison. As shown in Table IV the use of high density cracked polyethylene resulted in a significant increase in the ring and ball softening point of the blend.

TABLE IV

| Example | % | Ethylene Homopolymer Type | R&B Point, °F. | Viscosity cps./310°F. | Blend Properties Tensile Strength[3] lb./sq.in. | Elongation[3] % | Elastic Modulus[3], lb. |
|---|---|---|---|---|---|---|---|
| 8 | 2.9 | Cracked Polyethylene A[1] | 240 | 8.9M | 214 | 985 | 3M |
| 9 | 2.9 | Cracked Polyethylene B[2] | 252 | 13M | 230 | 1140 | 0.7M |
| 10 | 1.5 | Cracked Polyethylene B[2] | 236 | 13M | 282 | 1140 | 1.0M |
| 11 | 2.9 | Cracked Polyethylene A/B | 245 | 12.4M | 267 | 1029 | 1.1M |
| 12 | 2.9 | Cracked Polyethylene A/B | 242 | 11M | 333 | 912 | 1.2M |
| C11 | 0 | — | 158 | 11.7M | 233 | 1190 | 0.3M |
| 13 | 1.5 | "Polywax" 2000 | 227 | 9M | 270 | 1070 | 0.9M |
| 14 | 2.9 | "Polywax" 2000 | 240 | 10.6M | 295 | 994 | 1.6M |
| C12 | 2.9 | "AC" 8 | 212 | 11M | 261 | 898 | 4.2M |

[1]viscosity: 150 cps. at 280°F.
[2]viscosity: 4700 cps. at 280°F.
[3]determined by ASTM D1708-4.

I claim:

1. A composition having a ring and ball softening point of at least about 230°F. comprising
  A. about 4–25 weight percent ethylene/vinyl ester copolymer having a melt index of about 2 to 150, a copolymerizable ethylene content of about 72 to 82 weight percent, a copolymerizable vinyl ester content of about 18 to 28 weight percent, wherein the acid moiety of said vinyl ester contains 1 to 4 carbon atoms,
  B. about 0.7–5 weight percent of an ethylene homopolymer having a molecular weight of about 1,500–3,000, a density of about 0.94–0.97 g./cm.$^3$ and a melting point of about 240°F.–270°F.,
  C. about 10–15 weight percent of a polymer resin derived from the alkylation of aromatic compounds with dicyclopentadiene and having a softening point of about 40°F.–105°F.,
  D. about 10–15 weight percent of an aliphatic thermoplastic hydrocarbon resin substantially free of polymerized aromatics prepared from diene and olefin monomers of 5 to 7 carbon atoms and having a softening point of about 155°F.–240°F.,
  E. about 0.5–8 weight percent of a paraffin wax, and
  F. about 25–75 weight percent filler.

2. The composition of claim 1 wherein said ethylene homopolymer is present in about 1.7–3.0 weight percent.

3. The composition of claim 2 wherein said ethylene homopolymer is present in about 2.7–2.9 weight percent.

4. The composition of claim 2 wherein said ethylene/vinyl ester copolymer has a melt index of about 10–25.

5. The composition of claim 4 wherein said vinyl ester is vinyl acetate.

6. The composition of claim 5 wherein said ethylene/vinyl acetate copolymer is present in about 8–25 weight percent.

7. The carpet comprised of a primary backing material stitched with closely spaced erect loops of yarn to form a tufted structure, the bottom surface of the tufted structure having as a tuft bonding backsize adhesive coating the composition of claim 5.

8. The carpet of claim 7 wherein a secondary scrim is bonded with said backsize adhesive coating to the bottom surface of the tufted structure.

9. The composition of claim 4 wherein resin (D) has a softening point of about 215°F.–240°F. and resin (C) has a softening point of about 55°F.–90°F.

10. The composition of claim 9 wherein said paraffin wax has a melting point between about 146°F.–158°F. and a needle point penetration value between about 6–24 at 77°F.

11. The carpet comprised of a primary backing material stitched with closely spaced erect loops of yarn to form a tufted structure, the bottom surface of the tufted structure having as a tuft bonding backsize adhesive coating the composition of claim 10.

12. The carpet of claim 11 wherein a secondary scrim is bonded with said backsize adhesive coating to the bottom surface of the tufted structure.

13. A carpet comprised of a primary backing material stitched with closely spaced erect loops of yarn to form a tufted structure, the bottom surface of the tufted structure having as a tuft bonding backsize adhesive coating the composition of claim 1.

14. The carpet of claim 13 wherein a secondary scrim is bonded with said backsize adhesive coating to the bottom surface of the tufted structure.

* * * * *